US 8,252,076 B2

Aug. 28, 2012

(12) United States Patent
Israelson et al.

(54) BUFFING COMPOSITION AND METHOD OF FINISHING A SURFACE OF A MATERIAL

(75) Inventors: Ronald J. Israelson, St. Paul, MN (US); Rajesh K. Katare, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 277 days.

(21) Appl. No.: 12/744,402

(22) PCT Filed: Nov. 5, 2008

(86) PCT No.: PCT/US2008/082425
§ 371 (c)(1),
(2), (4) Date: May 24, 2010

(87) PCT Pub. No.: WO2009/073304
PCT Pub. Date: Jun. 11, 2009

(65) Prior Publication Data
US 2010/0248592 A1    Sep. 30, 2010

Related U.S. Application Data

(60) Provisional application No. 60/992,375, filed on Dec. 5, 2007.

(51) Int. Cl.
*B24D 3/02* (2006.01)
*C09C 1/68* (2006.01)
*C09K 3/14* (2006.01)
(52) U.S. Cl. .................. 51/309; 51/307; 451/28; 106/3
(58) Field of Classification Search .............. 51/307, 51/309; 451/28
See application file for complete search history.

(56) References Cited

U.S. PATENT DOCUMENTS

| | | | |
|---|---|---|---|
| 2,881,146 A * | 4/1959 | Remer et al. | 524/111 |
| 3,123,452 A | 3/1964 | Harris et al. | |
| 3,256,810 A * | 6/1966 | Ensink | 101/461 |
| 3,328,325 A | 6/1967 | Zdanowski | |
| 3,403,119 A | 9/1968 | Mccarthy | |
| 3,549,365 A | 12/1970 | Thomas | |
| 3,672,825 A | 6/1972 | Gambale et al. | |
| 3,695,942 A | 10/1972 | Binns | |
| 3,697,466 A | 10/1972 | Cahill | |
| 3,725,525 A | 4/1973 | Joos | |
| 3,729,437 A * | 4/1973 | Bernheim et al. | 23/417 |
| 3,808,036 A | 4/1974 | Zdanowski | |
| 3,835,078 A | 9/1974 | Zdanowski | |
| 3,850,732 A | 11/1974 | Binns | |
| 3,912,548 A | 10/1975 | Faigen et al. | |
| 3,918,220 A | 11/1975 | Jury et al. | |
| 5,833,724 A | 11/1998 | Wei et al. | |
| 5,863,306 A | 1/1999 | Wei et al. | |
| 6,190,237 B1 | 2/2001 | Huynh et al. | |
| 6,273,793 B1 | 8/2001 | Liners et al. | |
| 6,287,633 B1 | 9/2001 | Ogawa | |
| 6,290,735 B1 | 9/2001 | Kambe et al. | |
| 6,293,980 B2 | 9/2001 | Wei et al. | |
| 6,413,287 B1 | 7/2002 | Barber, Jr. | |
| 6,547,842 B1 | 4/2003 | Umehara et al. | |
| 6,596,042 B1 | 7/2003 | Feng et al. | |
| 6,906,339 B2 | 6/2005 | Dutta | |
| 7,029,507 B2 | 4/2006 | Yadav | |
| 7,045,001 B1 | 5/2006 | Kropp et al. | |
| 2002/0022372 A1 | 2/2002 | Chang | |
| 2002/0115734 A1 | 8/2002 | Obeng | |
| 2002/0129559 A1 | 9/2002 | Ito et al. | |
| 2003/0040259 A1 | 2/2003 | Umehara et al. | |
| 2003/0111417 A1 | 6/2003 | Paszkowski | |
| 2004/0197263 A1 | 10/2004 | Wang | |
| 2004/0226918 A1 | 11/2004 | Lee et al. | |
| 2005/0008560 A1 | 1/2005 | Kataoka et al. | |
| 2005/0076581 A1 | 4/2005 | Small et al. | |
| 2005/0132659 A1 | 6/2005 | Kumar et al. | |
| 2006/0025505 A1 | 2/2006 | Hammond | |
| 2006/0030243 A1 | 2/2006 | Nishimoto et al. | |
| 2006/0278614 A1 | 12/2006 | Wang et al. | |
| 2007/0256597 A1 * | 11/2007 | Rukavina et al. | 106/287.25 |

FOREIGN PATENT DOCUMENTS

| | | |
|---|---|---|
| EP | 0 387 988 A1 | 9/1990 |
| WO | WO 00/23534 A1 | 4/2000 |

OTHER PUBLICATIONS http://www.merriam-webster.com/dictionary/mode (May 1, 2012).*
PCT International Search Report, Feb. 5, 2009, International Application PCT/2008/082425, 3 pages.
PCT Written Opinion of International Search Report, Feb. 5, 2009, International Application PCT/2008/082425, 6 pages.

* cited by examiner

*Primary Examiner* — Jessica L Ward
*Assistant Examiner* — Ross J Christie
(74) *Attorney, Agent, or Firm* — Bradford B. Wright

(57) ABSTRACT

A buffing composition includes an emulsion having an aqueous liquid phase and an oily liquid phase; a solubilized zirconium carboxylate; and fine abrasive particles having a Mohs hardness of at least 4. The fine abrasive particles have a particle size distribution having at least one mode with a particle size of at least 5 micrometers. A method of finishing a surface of a material using the buffing composition is also disclosed.

11 Claims, No Drawings

BUFFING COMPOSITION AND METHOD OF FINISHING A SURFACE OF A MATERIAL

CROSS-REFERENCE TO RELATED APPLICATIONS

This application is a national stage filing under 35 U.S.C. §371 of PCT/US2008/082425, filed Nov. 5, 2008, which claims priority to U.S. Provisional Application No. 60/992,375, filed Dec. 5, 2007, the disclosures of which are incorporated by reference in their entirety herein.

BACKGROUND

The visual appearance of painted automotive surfaces (for example, exterior painted automotive surfaces) is an important aesthetic property. Original equipment manufacturer (that is, OEM) and aftermarket industries devoted many resources to the development and application of automotive paint systems that provide aesthetic properties such as, for example, low haze and good distinctness of image.

It is commonplace for automobile manufacturers to use a base coat and clear coat paint system. The base coat provides the desired color, while the clear coat, which is applied over the base coat, provides a transparent scratch/chip-resistant protective coat. Such paint systems typically magnify defects (for example, scratches, haze, and dust nibs) in either the base coat or the clear coat.

One common method for imparting (or restoring) a high quality appearance to an automotive paint system uses a multi-step process.

First the defects are abraded using a coated abrasive product with a fine abrasive particle size (for example, a sandpaper, or a structured abrasive article). This step provides rapid removal of the defects, but typically leaves a scuff (and sometimes scratches) that needs to be removed.

Next, scuffs are removed by buffing using a buffing composition. The buffing composition typically has a liquid vehicle and abrasive particles of typically smaller size than the abrasive particles used in the coated abrasive article. However, depending of the paint system, the buffing step may result in a surface with a hazy appearance.

The hazy appearance is removed by a finishing step in which the hazy portion of the paint system is buffed with a finishing composition. The finishing composition typically has a liquid vehicle and abrasive particles of smaller size than the abrasive particles used in the buffing composition.

Finally, residue from the buffing and/or finishing compositions is removed (for example, with a soft cloth) thereby producing an aesthetically appealing finish substantially free of surface residue.

In general, the cut rate of abrasive particles depends on their composition and particle size. Larger particles typically exhibit a higher cut rate, while very small particles are typically used in order to achieve a low haze. Hence, the reason for multiple steps typically relates, at least in part, to the need for quickly removing defects and achieving a flat smooth surface. This is achieved by using relatively large abrasive particles (which provide a high cut rate) in a first step (or multiple steps), and then using very fine abrasive particles (which have a low cut rate) to achieve a very low haze in one or more subsequent steps. This multiple step combination is most often optimized to achieve a high cut rate followed by a fine finish, all while minimizing the overall time required.

SUMMARY

In one aspect, the present disclosure provides a method of finishing a surface of a material, the method comprising steps:

(a) applying a buffing composition onto the surface of the material, wherein the buffing composition comprises:
an emulsion having an aqueous liquid phase and an oily liquid phase;
a solubilized zirconium carboxylate; and
fine abrasive particles having a Mohs hardness of at least 4, wherein the fine abrasive particles have a particle size distribution having at least one mode with a particle size of at least 5 micrometers; and
(b) buffing the surface of the material with the buffing composition.

In certain embodiments, the method further comprises after step (b):
(c) at least partially cleaning the surface of the material to remove at least a portion of the buffing composition.

In another aspect, the present disclosure provides a buffing composition comprising:
an emulsion having an aqueous liquid phase and an oily liquid phase;
a solubilized zirconium carboxylate; and
fine abrasive particles having a Mohs hardness of at least 4, wherein the fine abrasive particles have a particle size distribution having at least one mode with a particle size of at least 5 micrometers.

The following embodiments apply to each of the foregoing aspects and embodiments.

In certain embodiments, the material comprises a clearcoat or a paint (for example, an automotive clearcoat or an automotive paint). In certain embodiments, the buffing composition further comprises a thickener. In certain embodiments, the buffing composition further comprises a humectant. In certain embodiments, the abrasive particles have a particle size distribution having no mode with a mean particle size of greater than 20 micrometers. In certain embodiments, the buffing composition is essentially silicone-free. In certain embodiments, the buffing composition is essentially wax-free. In certain embodiments, the solubilized zirconium carboxylate comprises solubilized zirconium acetate. In certain embodiments, the solubilized zirconium carboxylate is present in an amount of from 0.26 to 1.0 percent, based on the total weight of the buffing composition.

Advantageously, and surprisingly, we have presently discovered that inclusion of a solubilized zirconium carboxylate in buffing compositions may sufficiently reduce haze (without a significant loss of cut) of paint system surfaces after buffing with a buffing composition that no additional finishing step is needed, thereby saving time and money.

As used herein,
the term "essentially wax-free" means containing less than about 0.1 percent of wax;
the term "essentially silicone-free" means containing less than about 0.1 percent of silicone;
the term "fine abrasive particles" refers to abrasive particles having a size distribution with fewer than 0.5 percent by weight of the particles having a particle size larger than 100 micrometers;
the term "mode" as applied to a particle size distribution refers to a local maximum particle size of the particle size distribution;
the term "solubilize" means to dissolve;
the term "solubilized zirconium carboxylate" includes any dissociated species and/or reaction products that may form upon dissolving and/or form over time in solution.

DETAILED DESCRIPTION

The present disclosure includes a buffing composition useful, for example, for paint system (re)finishing. The buffing composition includes an emulsion having an aqueous liquid phase and an oily liquid phase, a solubilized zirconium carboxylate, and fine abrasive particles.

The aqueous liquid phase typically, but not necessarily, comprises from 30 to 70 percent by weight of the buffing composition, more typically from 35 to 65 percent by weight, and still more typically from 40 to 60 percent by weight, based on the total weight of the buffing composition, with the remainder typically being the oily liquid phase and fine abrasive particles.

The aqueous liquid phase includes water, optionally in combination with water-soluble or miscible organic solvents (for example, lower alcohols, acetone, tetrahydrofuran, and combinations thereof).

Optionally the aqueous liquid phase may include at least one thickener in effective amounts, typically about 0.2 percent to about 5.0 percent, more typically about 0.5 percent to about 3.0 percent of the total weight of the buffing composition, to increase the viscosity and alter rheological characteristics, although other amounts may also be used. Suitable thickeners include, for example, acrylic polymers (for example, as available under the trade designation "ACRYSOL" optionally in combination with an alkaline activator (for example, monoethanolamine, diethanolamine, triethanolamine, morpholine), sodium alginate, gum arabic, polyoxyethylene, guar gum, hydroxypropyl guar gum, cellulose derivatives such as methylcellulose, methylhydroxypropylcellulose, hydroxypropylcellulose, polypropylhydroxyethylcellulose, starch and starch derivatives such as hydroxyethylamylose and starch amylose, locust bean gum, saccharides and derivatives of saccharides (for example, PEG-120 methyl glucose dioleate), clays (for example, synthetic clays marked under the trade designation "LAPONITE" by Southern Clay Products, Gonzales, Tex.), hydrous aluminum silicate, dimethyldioctadecyl salts of montmorillonite clay, colloidal silica, heavy metal soaps (for example, lead oleate, zinc oleate, zinc stearate, and aluminum stearate), and combinations thereof.

Optionally the aqueous phase may include at least one humectant. Examples of suitable humectants include glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas; and combinations thereof.

While not a requirement, the buffing composition typically includes an effective amount of at least one emulsifier to facilitate emulsion formation and stability. Suitable emulsifiers include any emulsifier useful in preparing oil-in-water emulsions or water-in-oil emulsions, desirably as stable emulsions. A stable emulsion is one in which the dispersed phase remains dispersed substantially within the continuous phase over a long time, which substantially prevents phase separation over time (sufficient for storage of the composition). Examples of suitable emulsifiers include nonionic emulsifiers, anionic emulsifiers, cationic emulsifiers, and combinations thereof. Nonionic emulsifiers are particularly suitable for use with the finishing composition, and include alcohol ethoxylates, alkyl phenol ethoxylates, polyoxypropylene/polyoxyethylene block copolymers, sorbitan fatty esters, castor oil, polyoxyethylene fatty esters, polyoxyalkylene monostearates, alkynols, polyoxyethylene nonylphenols, polyoxyethylene fatty alcohols, and combinations thereof. Suitable anionic emulsifiers include, for example, alkaryl sulfonates. Suitable cationic emulsifiers include, for example, polyoxyethylene fatty amines.

The oily liquid phase is generally immiscible with the aqueous liquid phase and typically includes at least one organic component such as, for example, a degreaser, lubricant, or a combination thereof.

Examples of degreasers include halogenated hydrocarbons (for example, trichloroethylene and trichloroethane), hydrocarbons (for example, toluene, mineral spirits, isoparaffin solvents, and Stoddard solvent), and combinations thereof.

Examples of lubricants include oils (for example, mineral, pine, and paraffinic oils), oleic acid, and combinations thereof.

Silicones (for example, silicone oils, silicone waxes, and/or volatile silicones) and waxes (for example, paraffin, petroleum waxes, such as microcrystalline petroleum waxes, carnauba, candelilla vegetable waxes, montan waxes derived from coal, synthetic polymer waxes, for example oxidized polyethylene, polytetrafluoroethylene (PTFE) and polyamides), and mixtures thereof may optionally be included in the buffing composition. However, their use is becoming less desirable, especially when used in automotive paint finishing, and accordingly the buffing composition may be formulated such that it is silicone-free and/or wax-free.

Suitable solubilizable zirconium carboxylates include, for example, zirconium carboxylates that are water-soluble or otherwise water-solubilizable (for example, by reaction with water). Examples include zirconium acetate, zirconium lactate, zirconium citrate, mixed salts thereof, and combinations thereof. One useful zirconium carboxylate is available from Inframat Advanced Materials, Farmington, Conn., under the trade designation "ZIRCONIUM ACETATE SOLUTION", Product No. 40C-ZAC-S1. Typically, the amount of zirconium carboxylate needed to achieve beneficial effects is in a range of from about 0.1 to about 5 percent based on the total weight of the buffing composition, more typically in a range of from about 0.2 to about 2 percent based on the total weight of the buffing composition, and even more typically in a range of from about 0.4 to about 1 percent based on the total weight of the buffing composition, although other amounts may also be used. In certain embodiments, the amount of zirconium carboxylate is in a range of from 0.15, 0.20, 0.25, 0.30, or 0.35 up to 0.5 percent, based on the total weight of the buffing composition. In certain embodiments, the amount of zirconium carboxylate is in a range of from 0.26 or 0.5 up to 1.0 percent, based on the total weight of the buffing composition.

The fine abrasive particles have a Mohs hardness of 4 or higher. For example, the fine abrasive particles may have a Mohs hardness of at least 4, at least 5, at least 6, at least 7, at least 8, or even at least 9. In general, the hardness of the abrasive particles should be greater than the hardness of the intended material to be abraded. Examples of suitable abrasive materials include aluminum silicates, aluminum oxide (for example, including alumina, heat treated alumina, and sintered alumina such as sol-gel alpha alumina-based abrasive grains), fused alumina zirconia, titanium diboride, chromia, iron oxide, silica, tin oxide, garnet, ceria, flint, diamond, silicon carbide, cubic boron nitride (CBN), boron carbide, and combinations thereof. Suitable fine abrasive mean particle sizes typically range from about 5 to about 20, 30, 40, or 50 micrometers, although values outside these limits may also be used.

The fine abrasive particles have a particle size distribution with fewer than 0.5 percent by weight of the particles having a particle size larger that 100 micrometers. While advantages may be achieved by inclusion of solubilized zirconium acetate with any small abrasive particles, the magnitude of the effect diminishes for abrasive particles with a particle size of less than about 5 micrometers. Accordingly, the fine abrasive particles have a particle size distribution with at least one mode with a particle size of at least 5 micrometers. Similarly, excessively large abrasive particles will tend to increase the amount of haze obtained. While this may not be important in some applications, in many, it is desirable that the abrasive particles have a particle size distribution having no mode with a mean particle size of greater than 70, 50, 30, or 20 micrometers, although this is not a requirement.

One or more surfactants (for example, wetting agents, dispersants) can be added to the composition to better disperse the ingredients therein. Surfactants lower the overall surface tension of the buffing composition, which typically results in better wetting out of the buffing composition onto the material to be buffed. In general, any type of surfactants (for example, anionic, cationic, nonionic, amphoteric/zwitterionic) can be used in the buffing compositions.

Typically, the buffing composition is formulated (for example, using thickeners and/or dispersants) such that the abrasive particles are substantially uniformly dispersed throughout the buffing composition for periods of minutes, hours, days, weeks, or longer, although this is not a requirement.

In addition to the components listed above, the buffing composition may optionally also include one or more additives such as, for example, preservatives (for example, biocide, fungicide), pigments, dyes, defoamers, and fragrances. Examples of suitable preservatives include aqueous, non-chlorinated, non-metallic preservatives (for example, as available under the trade designation "NUOSEPT" from International Specialty Products, Wayne, N.J.), microbicide preservatives (for example, as available under the trade designation "NUOCIDE" from International Specialty Products), personal-care product preservatives (for example, as available under the trade designation "KATHON" from Rohm and Haas Co., Philadelphia, Pa.), and combinations thereof. The preservative may be present in the buffing composition in any effective amount; for example, in an amount of from about 0.01 to about 0.5 percent by weight based on the total weight of the buffing composition.

The buffing composition may be formed by combining some or all of its various constituent components (typically without the fine abrasive particles) under high-shear conditions.

While any order of combining may be used, it is typically useful to sequentially add surfactant(s) and then thickening agents to at least a portion of the water to be included before adding the remaining components of the buffing composition. A suitable high-shear mixer includes a Premier model mixer, commercially available from the Dispersator Company, Temple, Pa. After the emulsion is formed, the fine abrasive particles may be mixed into the emulsion and dispersed. During the preparation of the buffing composition, it may be desirable to add the abrasive particles to the emulsion as a dispersion for ease of mixing.

In general, the abrasive particles are added to water or another solvent with an appropriate coupling agent or suspending agent to form the dispersion. Once all of the desired components are incorporated, the finishing composition may be mixed using a high-shear mixer for about five minutes at room temperature. Optionally, the mixing process may include low-shear or medium-shear mixing, and/or may be temperature-controlled during mixing to facilitate processing.

Once prepared, the buffing composition of the present disclosure may be used to finish (for example, polish and/or repair) the surface appearance of various materials. The buffing composition may be applied and distributed onto the surface (for example, in a section having an unacceptable haze level), or onto a buffing pad and then onto the surface. Additional cycles of distributing the buffing composition on the surface with buffing pads may also take place. After completion of the buffing process, the surface of the material is typically cleaned (for example, by rinsing and/or wiping) to remove residue. A surface-protective sealant (seal coat) may optionally be applied to the buffed surface to provide higher gloss or increased durability (additional protection from wear, rain, wind, etc.).

Examples of materials and articles that may be buffed (that is, workpieces) include fiberglass (for example, as used in boats, bathtubs, showers, spas, counters); coated surfaces (for example, painted surfaces, polyurethane coated surfaces, lacquered surfaces, for example, of furniture for example, pianos, dressers, tables, cabinets), vehicles (for example, automobiles, trucks, buses, airplanes), and appliances (for example, ovens, refrigerators, dishwashers, washers, dryers); plastics (for example, thermoplastic and/or thermosetting plastics) and reinforced plastics; metals and metal alloys (for example, carbon steel, brass, copper, mild steel, stainless steel, and titanium); ceramics; glass; composites; stones and stone-like materials (including gem-stones), and combinations thereof.

Of the foregoing, painted automotive surfaces (for example, including those having a clear coat, base coat, primer, and/or e-primer thereon) are well-suited to treatment with buffing compositions according to the present disclosure, either during new vehicle assembly, or during aftermarket repair. Examples include car doors, roofs, hoods, trunks, and quarter panels.

Objects and advantages of this disclosure are further illustrated by the following non-limiting examples, but the particular materials and amounts thereof recited in these examples, as well as other conditions and, details, should not be construed to unduly limit this disclosure.

EXAMPLES

Unless otherwise noted, all parts, percentages, ratios, etc. in the Examples and the rest of the specification are by weight.

The following abbreviations are used throughout the examples.

Table of Abbreviations

| ABBREVIATION | DESCRIPTION |
| --- | --- |
| BC1 | a buffing composition available from 3M Company, St. Paul, MN, under the trade designation "3M FINESSE-IT |

-continued

| ABBREVIATION | DESCRIPTION |
|---|---|
| | FINISHING MATERIAL EASY CLEAN UP": water, 40-70 percent; hydrotreated heavy naphtha (petroleum), 7-13 percent; medium aliphatic solvent naphtha, 7-13 percent; distillates (petroleum), acid treated, light, 5-10 percent; aluminum oxide 5-10 percent, glycerin 3-7 percent, white mineral oil (petroleum) 1-5 percent. |
| BC2 | a buffing composition available from 3M Company, St. Paul, MN, under the trade designation "3M FINESSE-IT POLISH-PURPLE": water, 40-70 percent; aluminum oxide, 5-10 percent; hydrotreated light petroleum distillates, 3-7 percent; distillates (petroleum), acid treated, light, 3-7 percent; white mineral oil (petroleum), 1-5 percent; dispersable polymers, 0.5-1.5 percent. |
| ZrAc | Zirconium acetate solution, Product No. 40C-ZAC-S1, equivalent 22 percent zirconium oxide, from Inframat Advanced Materials, Farmington, Conn. |

Test Methods:

Cut and Haze Test:

A pneumatic buffer available from Dynabrade, Clarence, N.Y., under the trade designation "DYNABRADE MODEL TYPE 57240R" air driven buffer (or equivalent), with a weight load of 5 pounds (2.3 kg) attached, air pressure set to 90-95 psi (620-660 kPa) and fitted with a 5-inch (13-cm) diameter foam backup pad available from 3M Company under the trade designation "3M FINESSE-IT CONTACT DISC PAD 14738, 5 IN×1 IN ⅝-11 INTERNAL" and a 5.25-inch (13.3-cm) diameter waffle-face foam buffing pad (available from 3M Company Product under the trade designation "3M FINESSE-IT BUFFING PAD 02362, FOAM ORANGE" is used in this test method.

A painted metal test panel obtained from ACT laboratories, Hillsdale, Mich. under the trade designation "PAINTED PANEL (18×24 INCH) APR45077-E-COAT ED6060, PRIMER 764204, BASECOAT 542AB921 BLACK, CLEAR RK8148" is cut to 9 inch×12 inch (23 cm×30 cm) size. The panel is cleaned and dried using an isopropanol-water (1:1) mixture and a soft lint-free cloth, and the weight is recorded. The panel is then fixed horizontally in place and 10 grams of buffing composition to be tested is applied to the center of the panel. The buffing composition is smeared around on the test panel with the buffing pad to uniformly coat the buffing pad, and then the buffer is turned on and the whole panel is uniformly buffed by hand for 60 or 120 seconds, using lateral motion and without applying substantial downward hand-force.

Upon completion the panel is wiped clean with a soft lint-free cloth, and then the panel is cleaned and dried using an isopropanol-water (1:1) mixture and a soft lint-free cloth, and the weight is recorded.

Cut is calculated as the difference between the initial and final weights of the panel. Haze is measured at the approximate center of each of the four quadrants of the buffed surface of the test panel (that is, resulting in four measurements) using a Byk-Gardner Haze Gloss meter, cat. no. AG-4601 at a 20 degree measurement angle. Lower haze units indicate less haze.

Examples 1 to 5 and Comparative Examples A to C

Buffing compositions were prepared by thoroughly mixing components as indicated in Table 1. Results of pH measurement and the Cut and Haze Test performed on the indicated examples are also reported in Table 1, wherein "NM" indicates that the item was not measured. Due to the large amount of test data recorded for Comparative Example A, results of the indicated number of replicates are reported as the average (that is, mean) and standard deviation (that is, st. dev.). For other examples in Table 1, reported results (other than "NM") correspond to non-replicated tests, and are presented in their entirety.

TABLE 1

| | | | CUT AND HAZE TEST RESULTS | | | |
|---|---|---|---|---|---|---|
| | | | 60 second test | | 120 second test | |
| EXAMPLE | BUFFING COMPOSITION | pH | Cut, grams | Haze, haze units | Cut, grams | Haze, haze units |
| COMPARATIVE EXAMPLE A | BC2 | 8.1-8.5 | average of 3 replicates = 0.08, st. dev. = 0.01 | average of 3 replicates = 25.5, st. dev. = 2.2 | average of 7 replicates = 0.17, st. dev. = 0.02 | average of 7 replicates = 20.9, st. dev. = 3.1 |
| COMPARATIVE EXAMPLE B | 100 parts BC2, 2.00 parts 0.1 N sulfuric acid | 7.8 | 0.06 | 21.9, 22.8, 27.9, 26.2 | NM | NM |
| 1 | 100 parts BC2, 0.1 part ZrAc | 7.7 | 0.09 | 24.2, 22.6, 23.3, 22.6 | 0.16 | 19.7, 24.1, 20.2, 22.8 |

TABLE 1-continued

| | | | \multicolumn{4}{c}{CUT AND HAZE TEST RESULTS} | | |
|---|---|---|---|---|---|---|
| | | | 60 second test | | 120 second test | |
| EXAMPLE | BUFFING COMPOSITION | pH | Cut, grams | Haze, haze units | Cut, grams | Haze, haze units |
| 2 | 100 parts BC2, 0.26 part ZrAc | 7.7 | 0.10 | 25.5, 23.4, 23.7, 27.3 | 0.17 | 17.9, 17.9, 17.3, 14.7 |
| 3A | 100 parts BC2, 0.5 part ZrAc | 7.3 | 0.08 | 15.1, 13.8, 12.1, 15.2 | 0.15 | 10.3, 10.7, 10.7, 10.5 |
| 3B | 100 parts BC2, 0.5 part ZrAc | 7.3 | NM | NM | 0.15 | 10.2, 10.7, 9.8, 9.8 |
| 4 | 100 parts BC2, 1 part ZrAc | NM | NM | NM | 0.11 | 10.8, 10.6, 10.4, 10.6 |
| COMPARATIVE EXAMPLE C | BC1 | NM | 0.08 | 24.9, 21.2, 25.0, 23.0 | 0.18 | 19.2, 19.4, 19.4, 19.6 |
| 5 | 100 parts BC1, 1 parts ZrAc | NM | 0.09 | 17.4, 16.6, 15.7, 16.3 | 0.12 | 11.9, 11.6, 11.6, 11.9 |

Various modifications and alterations of this disclosure may be made by those skilled in the art without departing from the scope and spirit of this disclosure, and it should be understood that this disclosure is not to be unduly limited to the illustrative embodiments set forth herein.

What is claimed is:

1. A method of finishing a surface of a material, the method comprising steps:
   (a) applying a buffing composition onto the surface of the material, wherein the buffing composition comprises:
      an emulsion having an aqueous liquid phase and an oily liquid phase;
      a solubilized zirconium carboxylate; and
      fine abrasive particles having a Mohs hardness of at least 4, wherein the fine abrasive particles have a particle size distribution having at least one mode with a particle size of at least 5 micrometers; and
   (b) buffing the surface of the material with the buffing composition.

2. The method of claim 1, further comprising after step (b):
   (c) at least partially cleaning the surface of the material to remove at least a portion of the buffing composition.

3. The method of claim 1, wherein the material comprises a clearcoat or a paint.

4. The method of claim 1, wherein the material comprises an automotive clearcoat or an automotive paint.

5. The method of claim 1, wherein the buffing composition further comprises a thickener.

6. The method of claim 1, wherein the buffing composition further comprises a humectant.

7. The method of claim 1, wherein the abrasive particles have a particle size distribution having no mode with a mean particle size of greater than 20 micrometers.

8. The method of claim 1, wherein the buffing composition is essentially silicone-free.

9. The method of claim 1, wherein the buffing composition is essentially wax-free.

10. The method of claim 1, wherein the solubilized zirconium carboxylate comprises solubilized zirconium acetate.

11. The method of claim 1, wherein the solubilized zirconium carboxylate is present in an amount of from 0.26 to 1.0 percent, based on the total weight of the buffing composition.

* * * * *